N. C. NELSON.
SKIRT SUPPORTER.
No. 19,576. Patented Mar. 9, 1858.
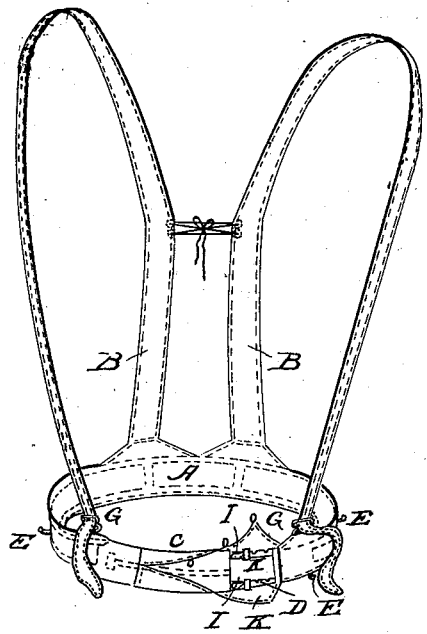
Fig. 1.
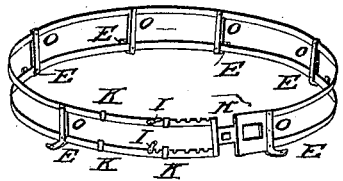
Fig. 2.
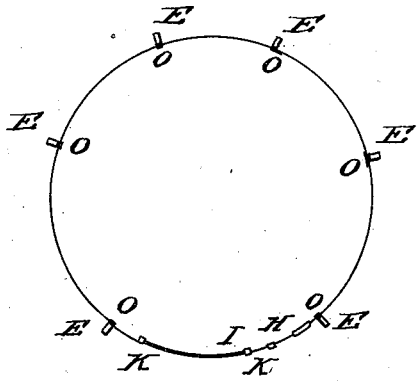
Fig. 3.
Fig. 4. Fig. 5.

UNITED STATES PATENT OFFICE.

N. C. NELSON, OF CONCORD, NEW HAMPSHIRE.

SKIRT-SUPPORTER.

Specification of Letters Patent No. 19,576, dated March 9, 1858.

*To all whom it may concern:*

Be it known that I, N. C. NELSON, of Concord, in the county of Merrimack and State of New Hampshire, have invented a new and Improved Mode of Supporting Skirts of Ladies' Dresses; and I do hereby declare that the following is a full and exact description thereof, reference being had to the accompanying drawings and to the letters of reference marked thereon.

Two objects are attained by my improvements: 1st, relief of the waist from the pressure incident to the usual method of appending skirts. 2d, facility of putting on, and taking off the skirts; this being done with the same ease as if no supporter were used.

The supporter consists of a waist-band A, Figure 1, to be worn about the waist and suspended from the shoulders by the shoulder-straps, B, B. The shoulder-straps have no peculiarity. They are attached to the waistband at four points and pass over the shoulders in the usual manner of shoulder straps, and are adjusted as to length by buckles G, G, in front. The waist-band consists of a brass frame suitably covered with cloth. The frame consists of two main pieces of thin plate brass, say ¼ inch wide, going around the body. These pieces are tied together and braced by perpendicular cross pieces, o, o, Fig. 2, which hold them an inch or so apart. These cross pieces consist, each, of two pieces of thin brass, put opposite each other, with the main-pieces between them, and riveted together through the main-pieces. Their upper ends are cut off even with the upper edge of the upper main piece. Their lower ends extend below the lower edge of the lower main piece and are then bent out so as to form arms E, E, E, Figs. 1, 2 and 3 of say ¾ inch projection. These arms are strengthened by filling the space, between the two pieces forming the arms with soft solder.

A capability of adjustment to size of waist is obtained by cutting off the main frame pieces and lapping the ends by each other and soldering to each end a loop, K, K, K, Figs. 1, 2, and 3, embracing the adjacent main piece. These allow the parts of the main pieces, lapping by each other, to slide upon each other and thus the frame can be lengthened or shortened at pleasure, similarly to the usual method employed for spectacle bows.

To fasten the frame at any required size, a dog, I, is hinged upon one piece and falls in notches cut in the edge of the adjacent or over-lapping piece. When the dog is down in a notch, slipping is prevented.

Fig. 2 represents one dog raised and one dog down. When the dog is raised the laps can slip freely upon each other. When this adjustment is once made it needs no readjustment for the same person. This portion of the frame is covered by a separate covering, C, Fig. 1, which can be opened by loops and buttons when this adjustment is needed to be made and then closed again. For daily taking off and putting on the frame is cut in two again and a large thin tongue, H, formed upon two adjacent ends of the main pieces and a large flat loop formed upon the two adjacent ends opposite for the reception of the tongue.

Figs. 2 and 3 represent the tongue as just entering the loop. Fig. 1, represents it fully inserted as when worn on the body. Fig. 1 represents the supporter as when being worn only that the piece of covering C should be buttoned.

To put the skirt-supporter on: suspend it from the shoulders by the shoulder straps and bring the waist-band around the waist and insert the tongue in the end loop. Then put on the skirts by putting the waist-bands of the skirts around the waist-band of the supporter above the arms E, E, E, buttoning, pinning or tying them just as if no supporter were used. The arms E, E, projecting out under the skirt waist-bands will support the skirts. The tongue H requires no fastening in the end loop. The inward pressure of the skirt-waist-bands will hold it in place while being worn and when the skirts are taken off the supporter waist-band readily comes off by simply pulling the tongue from the end-loop. The supporter-waist-band is made so as to be elastic and yielding yet sufficiently rigid as to be incompressible by the usual pressure of skirts upon the waist so as to protect the waist from pressure from skirts.

The advantages of this supporter are, 1st, it relieves the waist from pressure; 2d, facility of putting on and off skirts; it being done by simply tying them around the waist just as if no supporter were there. The trouble of buttoning the skirts upon the supporter waist-band is saved.

The frame of this supporter waist-band may be varied from the exact description as above and still retain the important features of my invention. It may be made of other material either metal or other substance and still have the requisite elasticity and incompressibility. The frame can be made of a single piece of sheet metal and the arms put upon it. The frame and arms together, or their equivalent can be made of one single piece of sheet metal formed into a band with its lower edge turned out or flared, making the band, bell-shaped, so that a cross-section at any point would give a figure like Fig. 4; or the lower edge could be turned up so as to give a cross-section like Fig. 5. It is evident that this flaring of the lower edge of the band, or rolling it up, would serve the same purpose for supporting the skirts as the arms E, E; and would be their equivalents, or, would be the same thing as a continuous series of arms. The adjustment to size of waist may be effected by other devices.

When the waistband is put on and the tongue inserted in the loop, the shoulder, at the origin of the tongue, comes against the loop and prevents further compression. The ends of the waistband thus abut together and prevent the further contraction of the waistband, so that the waistband is always of uniform size, and resists, of itself the inward pressure of the skirt waistbands, which are put about it, and so, relieves the waist from that pressure, and thus contributes much to the health and comfort of the wearer.

I do not claim a supporter-waistband with shoulder straps. I do not claim the use of hooks or buttons upon a supporter-waistband for the purpose of attaching skirts thereto. But I do claim—

The projecting out or flaring of the lower edge of the frame of the waist band, or of pieces attached to it as E, E, E, (making the waistband shaped like the natural waist), substantially in the manner described above; in order that the skirts may be supported, not by hooking, buttoning or tying them to the supporter-waistband, but by simply putting the skirt waistbands about the supporter waistband, in the same manner as they are put about the waist when no supporter is used.

N. C. NELSON.

In presence of—
 JOHN C. BRIGGS,
 E. KNIGHT.